United States Patent [19]

McMaster

[11] Patent Number: 5,011,525
[45] Date of Patent: Apr. 30, 1991

[54] APPARATUS FOR HIGH EFFICIENT SYMMETRICAL QUENCHING OF ROLLER CONVEYED GLASS SHEETS

[75] Inventor: Ronald A. McMaster, Perrysburg, Ohio

[73] Assignee: Glasstech, Inc., Perrysburg, Ohio

[21] Appl. No.: 594,684

[22] Filed: Oct. 9, 1990

Related U.S. Application Data

[63] Continuation of Ser. No. 473,912, Feb. 2, 1990, abandoned.

[51] Int. Cl.[5] .................. C03B 35/18; C03B 27/04
[52] U.S. Cl. .............................. 65/351; 65/104
[58] Field of Search ........................ 65/348–351, 65/104, 114

[56] References Cited

U.S. PATENT DOCUMENTS

| | | | |
|---|---|---|---|
| 3,522,029 | 7/1970 | Carson et al. | 65/104 |
| 3,672,861 | 6/1972 | Ritter et al. | 65/350 |
| 4,311,509 | 1/1982 | Roador et al. | 65/351 |
| 4,363,163 | 12/1982 | McMaster | 65/351 X |
| 4,515,622 | 5/1985 | McMaster et al. | 65/351 |
| 4,767,439 | 8/1988 | Reunamäki | 65/351 |

Primary Examiner—Robert L. Lindsay
Attorney, Agent, or Firm—Brooks & Ksuhman

[57] ABSTRACT

A quench station (14) including apparatus for quenching a heated glass sheet G conveyed by rolls (22) of a roller conveyor (20) is disclosed as including upper and lower sets of vertically aligned blastheads (32) having outlets (34) that are positioned closer to the conveyed glass sheet than the conveyor roll radius R and which are oriented and sized to provide highly efficient symmetrical quenching by aligned locations (36) of impingement with the oppositely facing surfaces of the glass sheet for heat strengthening or tempering. The blasthead outlets (34) are preferably round. A set of upper roll mimics (38) located above the conveyor rolls (22) in a vertically aligned relationship cooperate with the blastheads (32) in providing symmetry that results in uniform quenching of both glass sheet surfaces.

10 Claims, 2 Drawing Sheets

APPARATUS FOR HIGH EFFICIENT SYMMETRICAL QUENCHING OF ROLLER CONVEYED GLASS SHEETS

This is a continuation of application Ser. No. 473,912 filed on Feb. 2, 1990, now abandoned.

TECHNICAL FIELD

This invention relates to an apparatus for providing high efficient symmetrical quenching of roller conveyed glass sheets.

BACKGROUND ART

Quenching of heated glass sheets on roller conveyors such as for tempering or heat strengthening is difficult to perform because the conveyor rolls that support the glass sheet for conveyance obstruct the lower glass surface. As such, there is limited area for permitting the jets of quenching gas to impinge with the lower glass sheet surface and for the spent quenching gas to flow downwardly away from the glass sheet after impingement with the glass sheet. Furthermore, the presence of the conveyor rolls below the plane of conveyance provides a different quench configuration than above the plane of conveyance such that the lower and upper glass sheet surfaces are not quenched symmetrically to each other.

In order to accommodate for the conveyor roll obstruction problem at the lower glass sheet surface, it is conventional as disclosed in U.S. Pat. No. 4,515,622 McMaster et al to provide quenching gas outlets that are spaced from the glass sheet a distance at least as great as the conveying diameter of the conveyor rolls. Angling of quench tubes through which the quenching gas is supplied as disclosed by the McMaster et al patent permits a greater number of locations of impingement to be provided without blocking the area through which the spent quenching gas flows downwardly away from the conveyed glass sheet after its impingement with the adjacent glass sheet surface.

DISCLOSURE OF INVENTION

An object of the present invention is to provide improved apparatus for providing high efficient symmetrical quenching of roller conveyed glass sheets such as for heat strengthening or tempering.

In carrying out the above object and other objects of the invention, apparatus for quenching a heated glass sheet is disclosed as including a roller conveyor having horizontally extending conveyor rolls that convey the heated glass sheet in an direction of conveyance along a plane of conveyance. These conveyor rolls are spaced from each other along the direction of conveyance and have centers about which the conveyor rolls rotate to provide the conveyance. Each conveyor roll includes, an outer conveyor surface having a radius R. Upper and lower sets of blastheads of the apparatus are located above and below the plane of conveyance in vertical alignment with each other. Each blasthead has outlets through which quenching gas is supplied for flow along a path that impinges with the conveyed glass sheet with locations of impingement from the upper and lower blastheads aligned with each other. These outlets are each located closer to the conveyed glass than the conveyor roll radius R. Each outlet has a hydraulic diameter D and provides a gas flow path having a length L between the outlet and the impingement of the gas flow path thereof with the conveyed glass sheet. The outlets each have a characteristic length of L/D less than 6, and the outlets are spaced in a pattern and oriented to provide the gas flow paths thereof with different angles of incidence at the impingement thereof with the conveyed glass sheet. The outlets are also spaced and oriented to provide impingement locations spaced at the glass sheet in a center-to-center relationship with no two locations spaced closer to each other than the length L of the longest gas flow path. The apparatus also includes a set of upper roll mimics located above the conveyor rolls in a vertically aligned relationship.

High efficient symmetrical quenching of heated glass sheets is achieved by the roll mimics in cooperation with the relative close proximity of the quenching gas outlets to the glass sheet while maintaining the minimum spaced relationship specified so as to ensure adequate area for the spent quenching gas to escape after impingement with the conveyed glass sheet.

In the preferred construction of the apparatus, the outlets are generally round which provides the greatest efficiency in the quenching even through other shapes can be utilized to practice the invention.

In the preferred construction of the apparatus, the upper and lower blastheads preferably have the same size and shape as each other so as to thereby cooperate with the conveyor rolls and roll mimics in providing the symmetry above and below the plane of conveyance such that the lower and upper glass sheet surfaces are quenched symmetrically to each other and such that the upper and lower surfaces are aerodynamically balanced to thereby provide stable glass sheet conveyance on the roller conveyor without any up and down flutter.

Best results are achieved when the upper and lower sets of blastheads have the outlets thereof spaced and oriented to provide locations of impingement in an equilateral triangular pattern with the conveyed glass sheets. This equilateral triangular pattern permits the locations of impingements to be as close as possible to each other without obstructing the flow of the spent quenching gas away from the glass sheet after the impingement that provides the quenching.

In the preferred construction of the apparatus, each blasthead includes a formed sheet metal blasthead member that defines a quench gas plenum and the outlets through which the quenching gas is supplied from the plenum to the conveyed glass sheet as gas flow paths. Each outlet preferably includes a chamfered inlet through which the quenching gas enters the outlet for flow therethrough to the conveyed glass sheet. Each formed sheet metal blasthead member preferably has an elongated shape extending parallel to the conveyor rolls and has a formed cross section of a curved shape at which the outlets are located.

The objects, features and advantages of the present invention are readily apparent from the following detailed description of the best mode for carrying out the invention when taking in connection with the accompanying drawings.

BEST MODE FOR CARRYING OUT THE INVENTION

Figure 1:
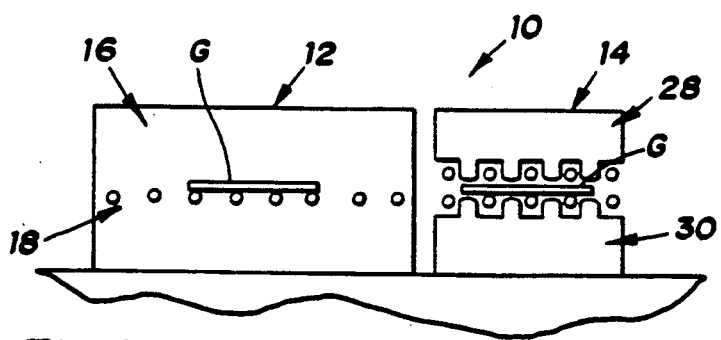
FIG. 1 is a side elevational view of a glass processing system for providing glass sheet quenching such as for tempering or heat strengthening.

With reference to FIG. 1 of the drawings, a glass sheet quench system 10 for providing heat strengthening or tempering includes a furnace 10 in which glass sheets G are heated for the quenching and also includes a quench station 14 that embodies apparatus of the present invention for providing symmetrical quenching of the heated glass sheet as is hereinafter more fully described. Furnace 10 includes a heating chamber 16 in which a roller conveyor 18 is located for providing conveyance of the glass sheet G for the heating in any conventional manner. After heating to a sufficiently high temperature to permit heat strengthening or tempering, the glass sheet G is conveyed from the furnace 12 to the quench station 14 for the quenching. The glass sheet conveyance may be in a single direction from the left toward the right or may be in an oscillating fashion in the furnace 12 and/or the quench station 14.

Figure 2:
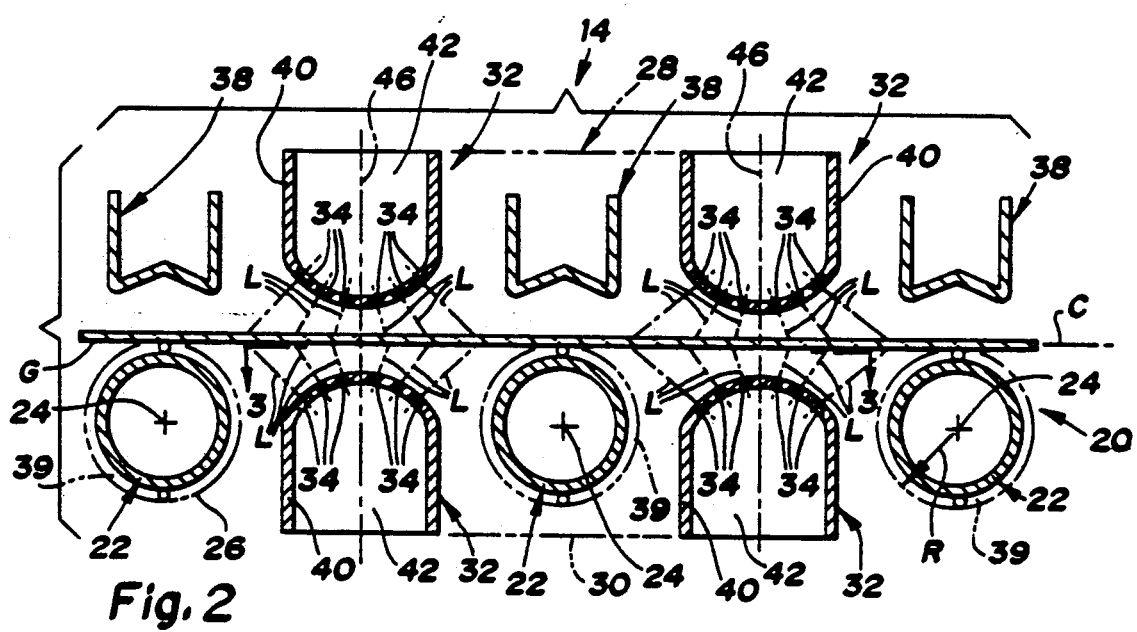
FIG. 2 is an enlarged elevational view taken in section through a quench station of the system in the same direction as viewed in FIG. 1.

With combined reference to FIGS. 1 and 2, the apparatus of the quench station 14 includes a roller conveyor 20 having horizontally extending conveyor rolls 22 that convey the heated glass sheet G in a direction of conveyance from the left toward the right along a plane of conveyance C. These conveyor rolls 22 and are spaced from each other along the direction of conveyance and have centers 24 about which they rotate to provide the conveyance of the heated glass sheet during the quenching. Each conveyor roll 22 has an outer conveying surface 26 of a round shape with a radius R by a construction that is hereinafter more fully described.

With continuing reference to FIGS. 1 and 2, the apparatus of the quench station 14 also includes upper and lower quenches 28 and 30 which include sets of blastheads 32 respectively located above and below the plane of conveyance C in vertical alignment with each other. Each blasthead 32 has outlets 34 through which quenching gas is supplied for impingement with the conveyed glass sheet at locations 36 which are vertically aligned at the upper and lower glass sheet surfaces at which the quenching gas is fed from the upper and lower blastheads, respectively. The blasthead outlets 34 are each located closer to the conveyed glass sheet G than the conveyor roll radius R.

Figure 3:
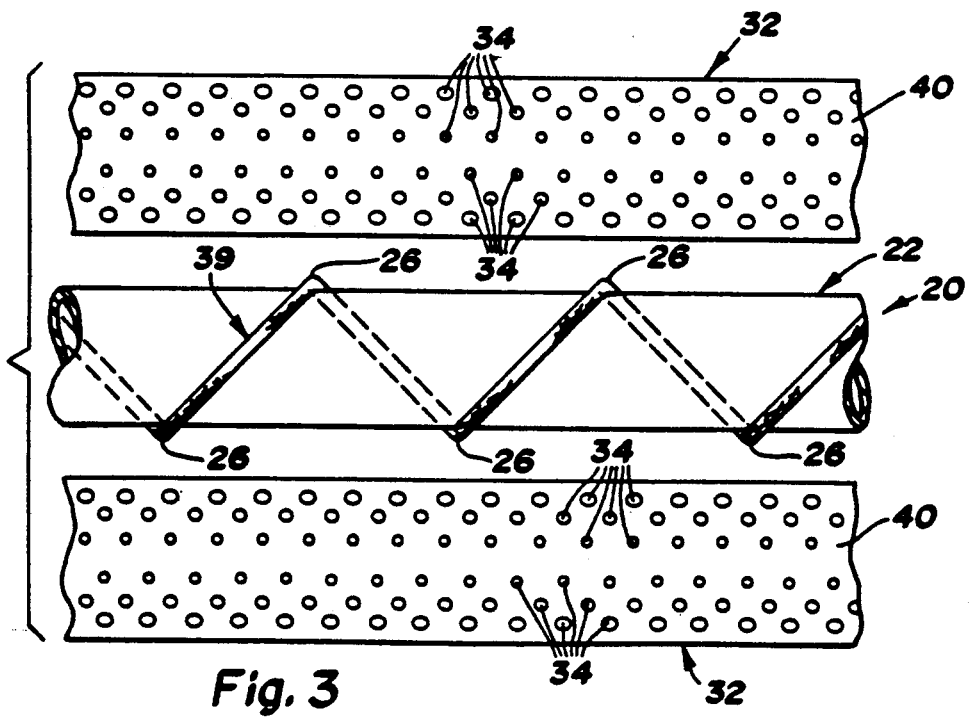
FIG. 3 is a plan view of the apparatus taken at the quench station along the direction of line 3—3 in FIG. 2.
Figure 4:
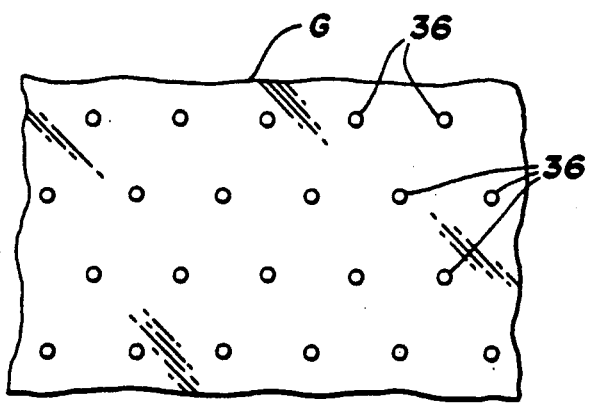
FIG. 4 is a view that illustrates the pattern of locations of impingement of gas flow paths with a conveyed glass sheet in a preferred equilateral triangular arrangement.
Figure 7:
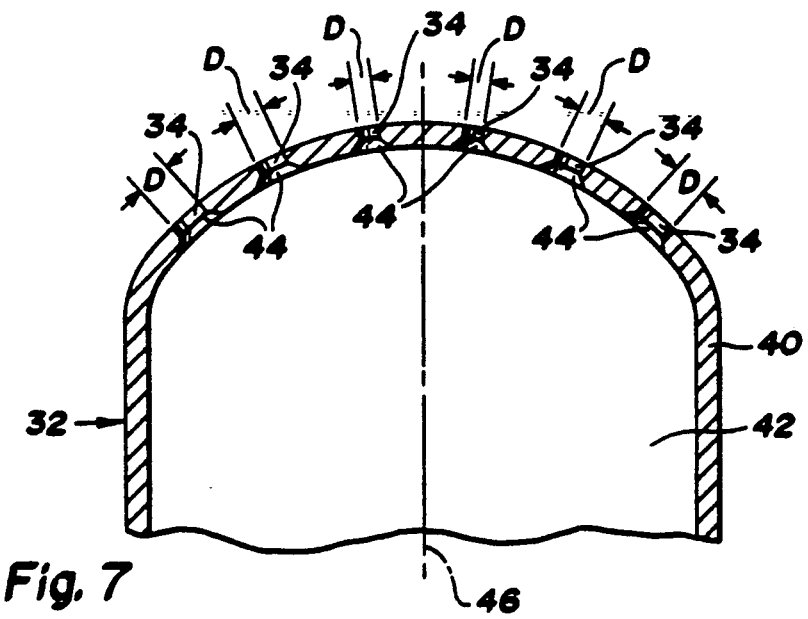
FIG. 7 illustrates the sheet metal member after forming thereof to the blasthead shape which preferably has an elongated construction whose cross section has a curved shape in which the outlets are located.

As shown in FIGS. 1 through 3 and FIG. 7, each blasthead outlet 34 has a hydraulic diameter D and provides a gas flow path having a length L between the outlet and the impingement of the gas flow path thereof with the conveyed glass sheet. More specifically, the hydraulic diameter D is equal to four times the area of the outlet divided by its circumference. Each outlet 34 has a characteristic length of L/D less than 6 which ensures that the gas jets provided are not too defused before impingement with the glass sheet. The outlets are spaced in a pattern as best shown in FIG. 3 and oriented as best shown in FIGS. 2 and 7 to provide the gas flow paths thereof with different angles of incidence at the impingement thereof with the conveyed glass sheet G. Furthermore, the outlets 34 are spaced and oriented to provide impingement locations 36 which, as shown in FIG. 4, are spaced at the glass sheet G in a center-to-center relationship with no two locations spaced closer to each other than the length L of the longest gas flow path. This limitation on the closeness of the spacing provides sufficient area for the spent quenching gas to flow away from the glass sheet after its impingement at the associated location 36. As shown in FIG. 2, the apparatus also preferably includes a set of upper roll mimics 38 located above the conveyor rolls 22 in a vertically aligned relationship. These roll mimics 38 have a size and shape that mimics the gas flow effect of the conveyor rolls 22 on which the glass sheet is conveyed.

In the preferred construction as illustrated best in FIG. 3, the outlets 34 are generally round. This round shape of the outlets provides the greatest efficiency in quenching gas flow so as to thereby provide a more efficient quench station.

As previously mentioned and as illustrated best in FIG. 2, the upper and lower sets of blastheads 32 are vertically aligned with each other and have the outlets 34 thereof spaced and oriented to provide locations of impingement aligned with each other. In other words, each gas flow path impinges with one surface of the glass sheet G at the associated impingement location 36 and another gas flow path impinges with the opposite surface of the glass sheet at the same location so as to provide symmetry in the quenching between the glass sheet surfaces.

Each conveyor roll 22 has a minor diameter and also has its conveyor surface 26 provided by a helically wrapped support 39 provided by woven aromatic polyamide fibers such as sold under the trademark Kevlar of E. I. DuPont Company of Wilmington, Del. United States of America. Such a support provides conveyance of the glass sheet without marking its heat softened lower surface prior to cooling. Each of the roll mimics 38 has a curved W-shaped cross section as illustrated, but other shapes could also be used so long as the gas flow at the upper glass surface is affected the same as the conveyor rolls affect the quenching gas flow at the lower surface of the glass sheet.

The upper and lower blastheads 32 as shown in FIG. 2 also preferably have the same size and shape as each other in order to provide symmetry in the configuration between the upper and lower surfaces of the glass sheet as far as affecting the quenching gas flow. However, it should be understood that the roll mimics 38 do have to be spaced upwardly slightly from the glass sheet G so as not to engage its upper surface and there is thus not exact structured symmetry above and below the upper and lower glass sheet surfaces even though the gas flow is aerodynamically symmetrical such that uniform quenching is provided at the upper and lower glass sheet surfaces. The aerodynamic symmetry also provides conveyance on the conveyor rolls 22 without any up and down flutter.

With reference to FIG. 4, the lower and upper sets of blastheads have the outlets thereof spaced and oriented to provide the impingement locations 36 in an equilateral triangular pattern with the conveyed glass sheet. This equilateral triangular pattern permits the impingement locations 36 to be positioned as close as possible to each other without the gas jets interfering with each other and while maintaining sufficient area for the spent quenching gas to escape after impingement with the glass sheet.

Figure 5:
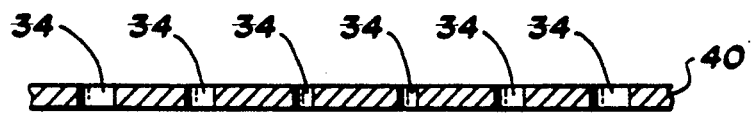
FIG. 5 is a sectional view illustrating a piece of sheet metal in which holes are provided to provide blasthead outlets.
Figure 6:
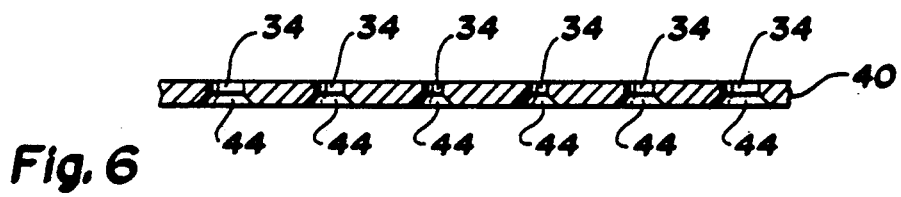
FIG. 6 is a sectional view illustrating chamfered inlets that are provided in the outlets of the sheet metal member to provide increased efficiency of the quenching gas flow through the outlets.

As best illustrated in FIG. 7, each blasthead 32 includes a formed sheet metal blasthead member 40 that defines a quench gas plenum 42 and the outlets 34. This formed sheet metal blasthead member 40 is manufactured from flat sheet metal, as shown in FIG. 5, through which the outlets 34 are initially stamped with a cylindrical shape. Thereafter, another stamping operation is performed to provide each outlet 34 with a chamfered inlet 44 which may either have sharp bevels as shown or smoothly curved bevels. The sheet metal blasthead member 40 is then formed from the flat condition of FIG. 6 to the configuration of FIG. 7 such that each outlet 34 has its chamfered inlet 44 through which the quenching gas enters the outlet for flow from the quench gas plenum through the outlet to the conveyed glass sheet. Efficiency is provided in the quenching by this chamfered construction of the inlet 44 of each outlet 34.

As illustrated in FIG. 3, each formed sheet metal blasthead member 40 has an elongated shape extending parallel to the conveyor rolls and, as shown in FIG. 7, has a formed cross section of a curved shape at which the outlets 34 are located.

As best illustrated by combined reference to FIGS. 2 and 3, each blasthead 32 has three different sizes of outlets 34 with the smallest outlets having the shortest gas flow path length L and the angle of incidence closest to a perpendicular relationship with the glass sheet plane of conveyance C. On each side of a centerline 46 of each blasthead 32 as illustrated in FIG. 2 and 3, the smallest size outlets 34 are located closest to the centerline 46 laterally intermediate the next largest size outlets 34 which have a greater angle of incidence and in alignment with the largest size outlets 34 which have the greatest angle of incidence. Furthermore, the smallest size outlets 34 on each side of the centerline 46 are located laterally intermediate the smallest size outlets 34 on the other side of the centerline 46.

While the best mode for practicing the invention has been described in detail, those familiar with the art to which this invention relates will recognize other embodiments and designs for practicing the invention as defined by the following claims.

What is claimed is:

1. Apparatus for quenching a heated glass sheet, comprising:
    a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each conveyor roll including an outer conveying surface and having a radius R;
    upper and lower sets of blastheads located above and below the plane of conveyance in vertical alignment with each other, each blasthead having outlets through which quenching gas is supplied for impingement with the conveyed glass sheet with the locations of impingement from the upper and lower blastheads aligned with each other, said outlets each being located closer to the conveyed glass sheet than the conveyor roll radius R, each outlet having a hydraulic diameter D and providing a gas flow path having a length L between the outlet and the impingement of the gas flow path thereof with the conveyed glass sheet, each outlet having a characteristic length of L/D less than 6, the outlets being spaced in a pattern and oriented to provide the gas flow paths thereof with different angles of incidence at the impingement thereof with the conveyed glass sheet, and the outlets being spaced and oriented to provide impingement locations spaced at the glass sheet; and
    a set of roll mimics located above the conveyor rolls in a vertically aligned relationship.

2. Apparatus as in claim 1 wherein the outlets are generally round.

3. Apparatus as in claim 2 wherein the upper and lower sets of blastheads each include a formed sheet metal blasthead member.

4. Apparatus as in claim 1 where the upper and lower blastheads have the same size and shape as each other.

5. Apparatus as in claim 1 wherein the upper and lower sets of blastheads have the outlets thereof spaced and oriented to provide the impingement locations in an equilateral triangular pattern with the conveyed glass sheet.

6. Apparatus as in claim 1 wherein each blasthead includes a formed sheet metal blasthead member that defines a quench gas plenum and the outlets.

7. Apparatus as in claim 6 wherein each outlet includes a chamfered inlet through which the quenching gas enters the outlet for flow therethrough to the conveyed glass sheet.

8. Apparatus as in claim 6 wherein each formed sheet metal blasthead member has an elongated shape extending parallel to the conveyor rolls and has a formed cross section of a curved shape at which the outlets are located.

9. Apparatus for quenching a heated glass sheet, comprising:
    a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each conveyor roll including an outer conveying surface having a radius R;
    upper and lower sets of blastheads located above and below the plane of conveyance in vertical alignment with each other and having the same size and shape as each other, each blasthead having generally round outlets through which quenching gas is supplied for impingement with the conveyed glass sheet, said outlets each being located closer to the conveyed glass sheet than the conveyor roll radius R, each outlet having a diameter D and providing a gas flow path having a length L between the outlet and the impingement of the gas flow path thereof with the conveyed glass sheet, each outlet having a characteristic length of L/D less than 6, the outlets being spaced in a pattern and oriented to provide the gas flow paths thereof with different angles of incidence at the impingement thereof with the conveyed glass sheet, and the outlets being spaced and oriented to provide impingement locations spaced at the glass sheet in a center-to-center relationship with the locations associated with the upper set of blastheads aligned with the locations associated with the lower set of blastheads; and a set of upper roll mimics located above the conveyor rolls in a vertically aligned relationship.

10. Apparatus for quenching a heated glass sheet, comprising:

a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each conveyor roll including an outer conveying surface having a radius R;

upper and lower sets of blastheads located above and below the plane of conveyance in vertical alignment with each other and having the same size and shape as each other, each blasthead including a formed sheet metal blasthead member defining a quench gas plenum and having generally round outlets through which quenching gas is supplied for flow from the plenum and impingement with the conveyed glass sheet, said outlets each being located closer to the conveyed glass sheet than the conveyor roll radius R, each outlet having a chamfered inlet through which the quenching gas enters the outlet from the quench plenum for flow therethrough to the conveyed glass sheet, each outlet having a diameter D and providing a gas flow path having a length L between the outlet and the impingement of the gas flow path thereof with the conveyed glass sheet, each outlet having a characteristic length of L/D less than 6, the outlets being spaced in a pattern and oriented to provide the gas flow paths thereof with different angles of incidence at the impingement thereof with the conveyed glass sheet, and the outlets being spaced and oriented to provide impingement locations spaced at the glass sheet in a center-to-center relationship with the locations associated with the upper set of blastheads aligned with the locations associated with the lower set of blastheads; and a set of upper roll mimics located above the conveyor rolls in a vertically aligned relationship.

* * * * *

UNITED STATES PATENT AND TRADEMARK OFFICE
CERTIFICATE OF CORRECTION

PATENT NO. : 5,011,525

DATED : April 30, 1991

INVENTOR(S) : Ronald A. McMaster

It is certified that error appears in the above-identified patent and that said Letters Patent is hereby corrected as shown below:

Column 2, Line 22
"through" should be --though--.

Column 2, Line 59
"taking" should be --taken--.

Column 3, Line 24
"10" should be --12--.

Column 3, Line 29 "10"
should be --12--.

Column 4, Line 4
"defused" should be --diffused--.

Signed and Sealed this

Third Day of November, 1992

*Attest:*

DOUGLAS B. COMER

*Attesting Officer*   Acting Commissioner of Patents and Trademarks